April 24, 1962 F. LOY 3,031,576
DEVICE FOR MEASURING AND DETECTING RADIATIONS
Filed Nov. 7, 1958 2 Sheets-Sheet 1

INVENTOR
FERNAND LOY

United States Patent Office 3,031,576
Patented Apr. 24, 1962

3,031,576
DEVICE FOR MEASURING AND DETECTING RADIATIONS
Fernand Loy, Neuilly-sur-Seine, France, assignor to North American Philips Company, Inc., New York, N.Y., a corporation of Delaware
Filed Nov. 7, 1958, Ser. No. 772,621
Claims priority, application France Nov. 6, 1957
4 Claims. (Cl. 250—83.3)

The invention relates to devices for measuring and detecting a radiation, of which the spectrum has various bands in common with that of a parasitic or background radiation also prevailing. The device according to the invention is particularly intended for detecting an invariable or a variable signal radiation superimposed on an invariable or a variable parasitic radiation, of which the spectral energy distribution is constant or substantially constant.

The invention has for its object to provide a device in which the influence of the parasitic radiation is eliminated wholly or partly.

The invention consists in that with a device of the aforesaid kind at least two detection elements are provided, which are exposed by way of selecting members, to radiations associated with different bands of the spectrum of the signal parasitic radiation and to the radiation to be measured or detected, provision being furthermore made of means to compensate the voltages due to the parasitic radiation and of means for indicating the resultant voltage.

A device according to the invention, which is particularly intended to eliminate the effect of sun beams, when observing the infrared radiation of a body, of which the temperature is lower than 200° C., may comprise, as detection elements, two photo-electric cells of lead sulphide and, as selection members, a monocrystal or a polycrystalline body of germanium which is arranged so that one of the cells is struck by that part of the radiation which is located in the spectral band to be observed and the other cell is struck, subsequent to filtering, by that part of the radiation which is located in the inner or the outer adjacent spectral bands.

The invention is particularly advantageous for detecting the heating of bearing blocks of axles of railway carriages.

The invention will now be described more fully with reference to the drawing.

Figure 1:
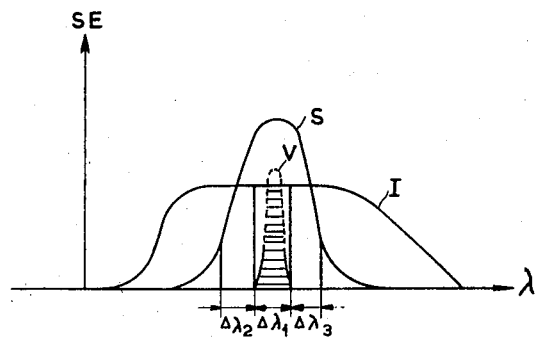
FIG. 1 shows a number of curves illustrating the sensitivity of an element and the spectral energy distribution.

Referring to FIG. 1, reference S designates the curve indicating the sensitivity of detection elements as a function of wavelength, without filtering; I designates the spectral distribution of the energy of the parasitic or background radiation, it being assumed, for the sake of simplicity, that the detection elements have the same sensitivity curves. V denotes the spectral distribution of the energy to be detected, subsequent to filtering.

It will first be supposed that the radiation to be observed or detected is located completely within the band designated by $\Delta\lambda_1$, for example, in the proximity of the sensitivity maximum of the detection elements. FIG. 1 indicates that in the proximity of the band $\Delta\lambda_1$ there are two bands $\Delta\lambda_2$ and $\Delta\lambda_3$, which can be detected. The principle underlying the invention consists in that the parasitic radiation in the band $\Delta\lambda_1$ is compensated by the radiation of one or more further bands of the parasitic radiation, for example, in the bands $\Delta\lambda_2$ and $\Delta\lambda_3$.

Figure 2:
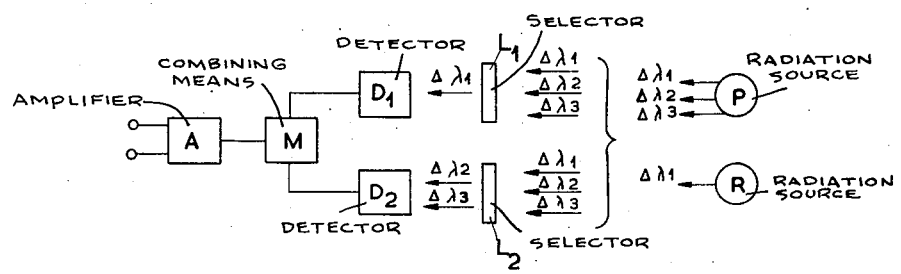
FIG. 2 shows a block diagram of a device according to the invention.

Referring to FIG. 2, which shows one embodiment, reference P denotes a source of radiation, of which the spectrum comprises the bands $\Delta\lambda_1$, $\Delta\lambda_2$ and $\Delta\lambda_3$; R is the source of signal radiation to be observed, which may be disturbed by the radiation from P on the surface of R. A selection element L, which may be a single unit or comprise a plurality of components, separates the band $\Delta\lambda_1$ from the bands $\Delta\lambda_2$ and $\Delta\lambda_3$, $D_1$ designates a detection element exposed to the radiation of the band $\Delta\lambda_1$, but not to the radiation of the bands $\Delta\lambda_2$ and $\Delta\lambda_3$; $D_2$ is a detection element exposed to the radiation of the bands $\Delta\lambda_2$ and $\Delta\lambda_3$, but not to that of the band $\Delta\lambda_1$. The assembly of radiations of R and P need not be homogeneous in a cross section of the beam incident in the device. The device must be such that the whole cross section of the beam reaches, in fact, each of the elements.

In the device M the output voltages of the detectors $D_1$ and $D_2$ are combined so that one voltage equal to zero is obtained, when the device is exposed exclusively to the parasitic radiation, irrespective of the intensity thereof. A designates an amplifier, which amplifies the voltage so that it is capable of governing a measuring instrument or a signalling device. By a correct adjustment of the elements of the device M it may be ensured that the output voltage of the amplifier A, in the absence of the radiation to be measured, is equal to zero.

If the radiation to be observed is superimposed on the parasitic radiation and if the characteristic curves of the detection elements and of the devices M and A are linear, the output voltage of the amplifier A will be equal to the voltage produced by the radiation to be observed in the absence of parasitic radiation. In the case under consideration the influence of the parasitic radiation can be completely eliminated, so that the radiation to be measured is accurately determined.

In the second place the case will be considered in which the spectrum of the radiation to be measured extends through the bands $\Delta\lambda_1$, $\Delta\lambda_2$ and $\Delta\lambda_3$. This spectrum will be, as a rule, different in the sensitivity range of the detection element from that of the parasitic radiation, although it extends through the same bands, so that the superimposition of the radiation to be measured produces, as a rule, an output voltage at the amplifier A, which voltage differs from zero. If the spectra of the parasitic radiation and of the radiation to be observed fulfill at the same time the compensation conditions of the bands $\Delta\lambda_2$ and $\Delta\lambda_3$ and of $\Delta\lambda_1$, it is simple to provide an absorption filter system and a device M which provide different effects for the radiation of the band $\Delta\lambda_1$ and of the bands $\Delta\lambda_2$ and $\Delta\lambda_3$, so that a compensation is obtained of only the parasitic radiation.

It is otherwise not necessary that the bands $\Delta\lambda_1$, $\Delta\lambda_2$ and $\Delta\lambda_3$ should lie side by side; a compensation of the band $\Delta\lambda_1$ by bands of the further remote parts of the spectrum may be readily obtained. It is a condition only that, when the compensation has been realized, it should be maintained for the time of the measurement. By optical agency a compensation may even be obtained by means of the detection elements $D_1$ and $D_2$, of which the sensitivity ranges are different. When using comparatively narrow, adjacent bands, as shown in FIG. 1, the voltages obtained by the bands $\Delta\lambda_1$, $\Delta\lambda_2$ and $\Delta\lambda_3$ will always be proportional, even if the spectral distribution of the parasitic radiation varies during the measurement.

The two embodiments described refer to devices intended for the elimination of the influence of sun beams with the measurement of infrared radiation between 2 and $3\mu$, emitted by a hot body having a temperature below 200° C. Both the direct radiation and the radiation reflected at the surface of the body observed may be considered as a troublesome parasitic radiation. Owing to the selective absorption by the atmosphere and to the selective reflection, this selective radiation does not exhibit an invariable spectral energy distribution. However, if two adjacent, narrow bands are observed, the influence of the parasitic radiation may be almost completely eliminated. In the embodiments described two adjacent bands are obtained by using suitably arranged, selective elements in the range of the useful radiation or directly at the side thereof.

In the first case the opposed bands are located each on one side of the wavelength of $1.9\mu$; they are referred to as outer bands. In the second case the two opposed bands are located on the same side of the wavelength of $1.9\mu$; they are termed inner bands. The distribution of the spectrum is obtained by using substances having a threshold pass value in the neighbourhood of the spectral band in which the radiation to be observed is located.

In both cases, preferably a plate with parallel surfaces is used, which is constituted by a monocrystal or a polycrystal of germanium. The two surfaces are polished. It is known that such a plate exhibits little selective, metallic reflection; it operates as a semi-pervious mirror: only the radiation of a wavelength exceeding about $1.9\mu$ passes through the plate, the further part of the spectrum is reflected.

Figure 3A:
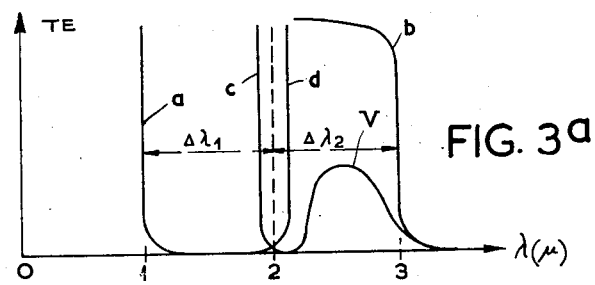
FIG. 3a shows the spectral characteristic curves of the substances employed in a first embodiment of a device according to the invention.

FIG. 3a shows the optical absorption as a function of wavelength of substances employed in the first embodiment of the invention. The curve $a$ is the characteristic of silicon, $b$ that of glass used for the optical input system, $c$ is the characteristic of a plate constituted by a germanium crystal having parallel surfaces, and $d$ that of a synthetic material, known under the name of Plexiglas. By using these substances it is possible to produce two outer adjacent bands, of which one is located between about 1 and $1.9\mu$ and the other between 1.9 and $3\mu$; V is the curve of the spectral energy distribution of the radiation to be detected subsequent to filtering by the optical input system.

Figure 3B:
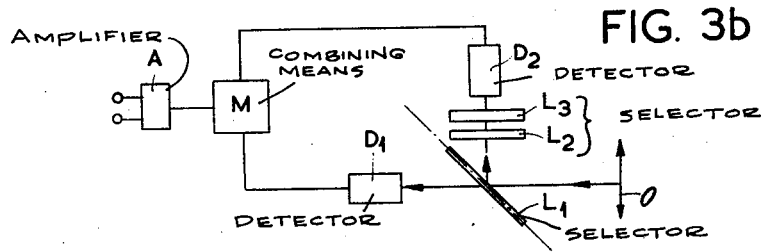
FIG. 3b is a diagrammatic view of a device according to the invention with the compensation of two outer, adjacent spectral bands.

FIG. 3b shows the circuit diagram of the first embodiment, in which the said outer, adjacent bands are employed for the compensation of the parasitic radiation. In this figure O designates a glass optical system and $L_1$ a Ge plate at an angle of 45° to the beam, which, as previously explained, transmits wavelengths greater than $1.0\mu$ but reflects everything shorter. $L_2$ and $L_3$ designate the silicon plates and Plexiglas plates, and $D_1$ and $D_2$ denote the lead sulphide cells having exactly the same optical range. The cell $D_1$ is therefore exposed to the band between 1.9 and $3\mu$ containing the signal radiation, and the cell $D_2$ to the band between 1 and $1.9\mu$. In the absence of a radiation to be detected, the cells and the circuit M supply opposed voltages, so that the output voltage of M is equal to zero.

Figure 4A:
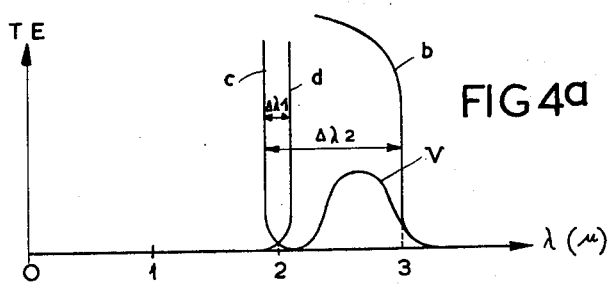
FIG. 4a shows the spectral characteristic curves of substances employed in a second embodiment of a device according to the invention.

FIG. 4a shows the absorption characteristics of substances which may be used in the second case; the characteristics $b$ and $c$ apply to the glass of the optical input system and to a germanium plate respectively, and $d$ designates the same material as in the former embodiment. It is possible, in this case, to obtain two inner adjacent bands, of which one is located between about 1.9 and $3\mu$ and the other between 1.9 and $2.1\mu$. The curve V indicates the spectral energy distribution of the radiation to be detected, subsequent to filtering by the optical input system.

Figure 4B:
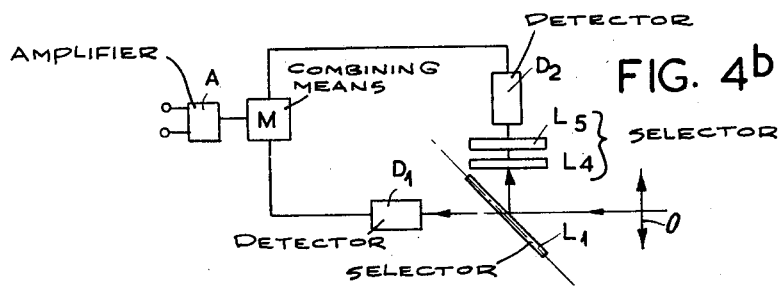
FIG. 4b is a diagrammatic view of a device according to the invention with the compensation of two inner, adjacent spectral bands.

FIG. 4b shows the diagram of the second embodiment. The references thereof correspond to those of FIG. 3b. A difference is found, however, in the filters of the cell $D_2$. To this end a plate $L_4$ of Plexiglas and a plate $L_5$ of a germanium crystal are used in accordance with FIG. 3b. The cell $D_1$ is therefore exposed to the band lying between 1.9 and $3\mu$, the cell $D_2$ to the band between 1.9 and $2.1\mu$. In the absence of the radiation to be detected compensation takes place in the device M.

In spite of the variations in the energy distribution in the sun beam spectrum, it has been found to be possible to obtain a substantially complete compensation of this parasitic radiation. In this respect the second embodiment is better than the first, which may be ascribed to the fact that the range in which the compensation takes place is narrower, owing to which the energy distribution of the parasitic radiation varies to a smaller extent.

The energy distribution between the reflected beam and the beam passed may be improved by covering the crystals with dielectric layers which produce an interference. Instead of using germanium, other substances may be employed.

The compensation of the spectral variations may be carried out in a different way; in the absence of a radiation to be detected, and in the presence of a parasitic radiation, the output voltage of the amplifier A may be caused to act upon a servo motor, which actuates given elements in the device M. As an alternative, the servo motor may vary the permeability between the output of the element L and one of the detectors, for example, by the interposition of a plate of absorbing material of variable thickness or a variable diaphragm.

The invention is not confined to the devices in which the compensation of the parasitic radiation is obtained by means of a combination of two or three bands of the spectrum. It comprises all variants based on the principle of the compensation of the parasitic radiation by itself, as described above.

If various parasitic radiations prevail, some of which may vanish during the measurement or may vary independently of the others, a compensation of each of the groups of the simultaneously varying parasitic radiations may, as a rule, be obtained by using a selective element with a sufficient width of the spectrum, in conjunction with an adequate number of detection elements. The number of detection elements is always at least one more than the number of non-simultaneously varying parasitic radiations. The only parasitic radiations that can be compensated are in this case, of course, those of which the spectrum coincides partly with the spectrum of the radiation to be detected or with the spectrum of a parasitic radiation already compensated.

What is claimed is:

1. A device for detecting infra-red signal radiation having a first spectrum substantially in the range of 2 to 3 microns generated by a hot body in the presence of interfering background radiation having a second spectrum overlapping with that of the first, comprising selective absorbing means for receiving said signal and background radiation and producing therefrom a first narrow band of radiation including the first spectrum and a portion of the second spectrum, and a second narrow band of radiation containing substantially only the second spectrum, said first and second bands being substantially 1.9 to 3 microns and 1.9 to 2.1 microns, respectively, first detection means exposed only to the first band and producing a first voltage in response thereto, second detection means exposed only to the second band and producing a second voltage in response thereto, circuit means coupled to both the first and second detection means for combining their voltages to provide an output in a manner at which, in the absence of signal radiation, said output is substantially at a predetermined level, and means coupled to the combining means for utilizing its output when the signal radiation is present.

2. A device for detecting infra-red signal radiation having a first spectrum substantially in the range of 2 to 3 microns generated by a hot body in the presence of interfering background radiation having a second spectrum overlapping with that of the first, comprising selective absorbing means for receiving said signal and background radiation and producing therefrom a first narrow band of radiation including the first spectrum and a portion of the second spectrum, and a second narrow band of radiation containing substantially only the second spectrum, said first and second bands being substantially 1.9 to 3 microns and 1 to 1.9 microns, respectively, first detection means exposed only to the first band and producing a first voltage in response thereto, second detection means exposed only to the second band and producing a second voltage in response thereto, circuit means coupled to both the first and second detection means for combining their voltage in response thereo, circuit means coupled to both the absence of signal radiation, said output is substantially at a predetermined level, and means coupled to the combining means for utilizing its output when the signal radiation is present.

3. A device for detecting infra-red signal radiation having a first spectrum generated by a hot body in the presence of interfering background radiation having a second spectrum overlapping with that of the first, comprising selective absorbing means for receiving said signal and background radiation and producing therefrom a first narrow band of radiation including the first spectrum and a portion of the second spectrum, and a second narrow band of radiation containing substantially only the second spectrum, first detection means exposed only to the first band and producing a first voltage in response thereto, second detection means exposed only to the second band and producing a second voltage in response thereto, circuit means coupled to both the first and second detection means for combining their voltages in a manner at which, in the absence of signal radiation, its output is substantially zero, and means coupled to the combining means for utilizing its output when the signal radiation is present, said first spectrum being substantially in the range of 2 to 3 microns, said first band being substantially 1.9 to 3 microns, and said second band being substantially 1.9 to 2.1 microns.

4. A device for detecting infra-red signal radiation having a first spectrum generated by a hot body in the presence of interfering background radiation having a second spectrum overlapping with that of the first, comprising selective absorbing means for receiving said signal and background radiation and producing therefrom a first narrow band of radiation including the first spectrum and a portion of the second spectrum, and a second narrow band of radiation containing substantially only the second spectrum, first detection means exposed only to the first band and producing a first voltage in response thereto, second detection means exposed only to the second band and producing a second voltage in response thereto, circuit means coupled to both the first and second detection means for combining their voltages in a manner at which, in the absence of signal radiation, its output is substantially zero, and means coupled to the combining means for utilizing its output when the signal radiation is present, said first spectrum being in the range of 2 to 3 microns, said first band being 1.9 to 3 microns, and said second band being 1 to 1.9 microns.

References Cited in the file of this patent

UNITED STATES PATENTS

| | | |
|---|---|---|
| 1,458,165 | Coblentz | June 12, 1923 |
| 1,963,185 | Wilson | June 19, 1934 |
| 2,114,163 | Bird | Apr. 12, 1938 |
| 2,490,011 | Bird | Dec. 6, 1949 |
| 2,531,000 | Scott | Nov. 21, 1950 |
| 2,650,311 | Bray et al. | Aug. 25, 1953 |
| 2,692,950 | Wallace | Oct. 26, 1954 |
| 2,794,926 | Watts et al. | June 4, 1957 |
| 2,810,835 | Miller | Oct. 22, 1957 |
| 2,816,233 | Krueger | Dec. 10, 1957 |
| 2,824,235 | Hahn et al. | Feb. 18, 1958 |
| 2,856,531 | Brouwer | Oct. 14, 1958 |
| 2,856,540 | Warshaw | Oct. 14, 1958 |
| 2,927,212 | Shimukonis et al. | Mar. 1, 1960 |
| 2,931,911 | Nichols | Apr. 5, 1960 |

UNITED STATES PATENT OFFICE
CERTIFICATE OF CORRECTION

Patent No. 3,031,576    April 24, 1962

Fernand Loy

It is hereby certified that error appears in the above numbered patent requiring correction and that the said Letters Patent should read as corrected below.

Column 5, line 18, strike out "voltage in response thereo, circuit means coupled to both" and insert instead -- voltages to provide an output in a manner at which, in --.

Signed and sealed this 30th day of October 1962.

(SEAL)
Attest:

ERNEST W. SWIDER
Attesting Officer

DAVID L. LADD
Commissioner of Patents